United States Patent
Callahan

(10) Patent No.: US 10,866,803 B2
(45) Date of Patent: Dec. 15, 2020

(54) GENERATING INTERACTION LIBRARIES

(71) Applicant: Red Hat, Inc., Raleigh, NC (US)

(72) Inventor: Jacob Callahan, Clayton, NC (US)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 16/273,748

(22) Filed: Feb. 12, 2019

(65) Prior Publication Data

US 2020/0257524 A1 Aug. 13, 2020

(51) Int. Cl.
| | | |
|---|---|---|
| *G06F 8/71* | (2018.01) | |
| *G06F 11/36* | (2006.01) | |
| *G06F 8/41* | (2018.01) | |
| *G06F 9/54* | (2006.01) | |
| *G06F 8/73* | (2018.01) | |
| *G06F 8/36* | (2018.01) | |

(52) U.S. Cl.
CPC .................. *G06F 8/71* (2013.01); *G06F 8/36* (2013.01); *G06F 8/41* (2013.01); *G06F 8/427* (2013.01); *G06F 8/447* (2013.01); *G06F 8/73* (2013.01); *G06F 9/54* (2013.01); *G06F 11/368* (2013.01)

(58) Field of Classification Search
CPC ... G06F 8/427; G06F 8/70; G06F 8/71; G06F 8/73; G06F 9/54
USPC .......................................... 717/120–123, 143
See application file for complete search history.

(56) References Cited

U.S. PATENT DOCUMENTS

| | | | | |
|---|---|---|---|---|
| 7,502,999 B1* | 3/2009 | Saiyed | ....................... | G06F 8/73 715/205 |
| 7,549,144 B2* | 6/2009 | Jubran | ................ | G06F 9/44589 717/143 |
| 7,581,207 B2* | 8/2009 | Bolder | ................ | H04L 41/0826 714/738 |
| 8,091,071 B2* | 1/2012 | Tsantilis | .................... | G06F 8/52 717/120 |
| 8,528,008 B2* | 9/2013 | Lu | ........................... | G06F 21/14 717/139 |
| 9,189,244 B2* | 11/2015 | McMahon | .............. | G06F 21/60 |
| 9,471,283 B2* | 10/2016 | Esfahany | .............. | G06F 40/205 |
| 9,489,217 B2* | 11/2016 | Komarov | ................ | G06F 9/453 |
| 9,946,529 B2* | 4/2018 | Sankaranarasimhan | ..................... | G06F 16/951 |

(Continued)

FOREIGN PATENT DOCUMENTS

CN 106201889 A 12/2016

OTHER PUBLICATIONS

Pandita, R. et.al, Inferring Method Specifications from Natural Language API Descriptions, ICSE '12: Proceedings of the 34th International Conference on Software Engineering, Jun. 2012, pp. 815-825, [retrieved on Aug. 7, 2020], Retrieved from the Internet.*

(Continued)

*Primary Examiner* — Geoffrey R St Leger

(74) *Attorney, Agent, or Firm* — Kilpatrick Townsend & Stockton LLP

(57) ABSTRACT

Interaction libraries can be generated. For example, a system can determine characteristics of an application interface for a software application by applying a parser to documentation related to the software application. The system may then build an interaction library based on the characteristics. The interaction library can be incorporated into source code for a program to enable the program to interact with the software application via the application interface.

20 Claims, 5 Drawing Sheets

(56) References Cited

U.S. PATENT DOCUMENTS

| | | | |
|---|---|---|---|
| 10,067,863 | B1 | 9/2018 | Gandhi et al. |
| 10,394,552 | B2* | 8/2019 | Elkabany ............ G06F 8/71 |
| 2009/0210861 | A1* | 8/2009 | Alupului ............ G06F 8/73 |
| | | | 717/123 |
| 2009/0249373 | A1* | 10/2009 | Lu ............ G06F 21/14 |
| | | | 719/331 |
| 2010/0146483 | A1* | 6/2010 | Komarov ............ G06F 8/73 |
| | | | 717/120 |
| 2014/0289702 | A1* | 9/2014 | McMahon ............ G06F 9/44 |
| | | | 717/120 |
| 2015/0248276 | A1* | 9/2015 | Chan ............ G06F 8/30 |
| | | | 719/328 |
| 2015/0317156 | A1* | 11/2015 | Chan ............ G06F 8/73 |
| | | | 717/123 |
| 2015/0363171 | A1* | 12/2015 | Esfahany ............ G06F 40/205 |
| | | | 717/106 |
| 2016/0055077 | A1 | 2/2016 | Baloch et al. |
| 2016/0321040 | A1* | 11/2016 | Sankaranarasimhan ............ |
| | | | G06F 8/34 |
| 2017/0337052 | A1* | 11/2017 | Elkabany ............ G06F 8/71 |
| 2018/0321918 | A1* | 11/2018 | McClory ............ G06F 8/71 |
| 2018/0322036 | A1 | 11/2018 | Alam et al. |
| 2019/0287197 | A1* | 9/2019 | Chang ............ G06Q 50/205 |

OTHER PUBLICATIONS

Nguyen, T., et al., Learning API Usages from Bytecode: A Statistical Approach, ICSE '16: Proceedings of the 38th International Conference on Software Engineering, May 2016, pp. 416-427, [retrieved on Aug. 7, 2020], Retrieved from the Internet.*

Conesa, F.V., "Mobile Architecture for School Garnification," Feb. 16, 2016, https://upcommons.upc.edu/bitstream/handle/2117/101237/memoria.pdf.

"What is Swagger?," SmartBear Software, 2018, https://swagger.io/docs/specification/2-0/what-is-swagger/.

"Junos® OS REST API Guide," Juniper Networks, Aug. 21, 2018, https://www.juniper.net/documentation/en_US/junos/information-products/pathway-pages/rest-api/rest-api.pdf.

"OpenAPITools/openapi-generator," GitHub, 2018, https://github.com/OpenAPITools/openapi-genrator.

* cited by examiner

GENERATING INTERACTION LIBRARIES

TECHNICAL FIELD

The present disclosure relates generally to software libraries. More specifically, but not by way of limitation, this disclosure relates to building interaction libraries.

BACKGROUND

Application interfaces such as application programming interfaces (API) and command line interfaces (CLI) enable application-to-application interactions. An API is a set of functions and procedures that enables interaction with a computer program, such as an operating system, application, or service. APIs typically include a variety of operations, commands, and functions available to developers to enable interaction with the computer program. Examples may include "save as" functions, send/receive requests, directory access requests, file manipulations, and the like. A CLI is a set of functions that enable interaction with a computer program via commands to the program in the form of lines of text. Examples of command-line interfaces include DEC's DIGITAL Command Language (DCL) in OpenVMS and RSX-11, the various Unix shells (sh, ksh, csh, tcsh, bash, etc.), CP/M's CCP, DOS's COMMAND.COM, as well as the OS/2 and the Windows CMD.EXE programs.

Developers may enable a software application to interact with an application interface by incorporating an interaction library into the source code for the software application. An interaction library can be a code library formed from one or more files with source code for the various functions and procedures that enable interactions with an application interface. Interaction libraries are typically specific to a certain version of an application interface.

DETAILED DESCRIPTION OF THE INVENTION

Figure 1:
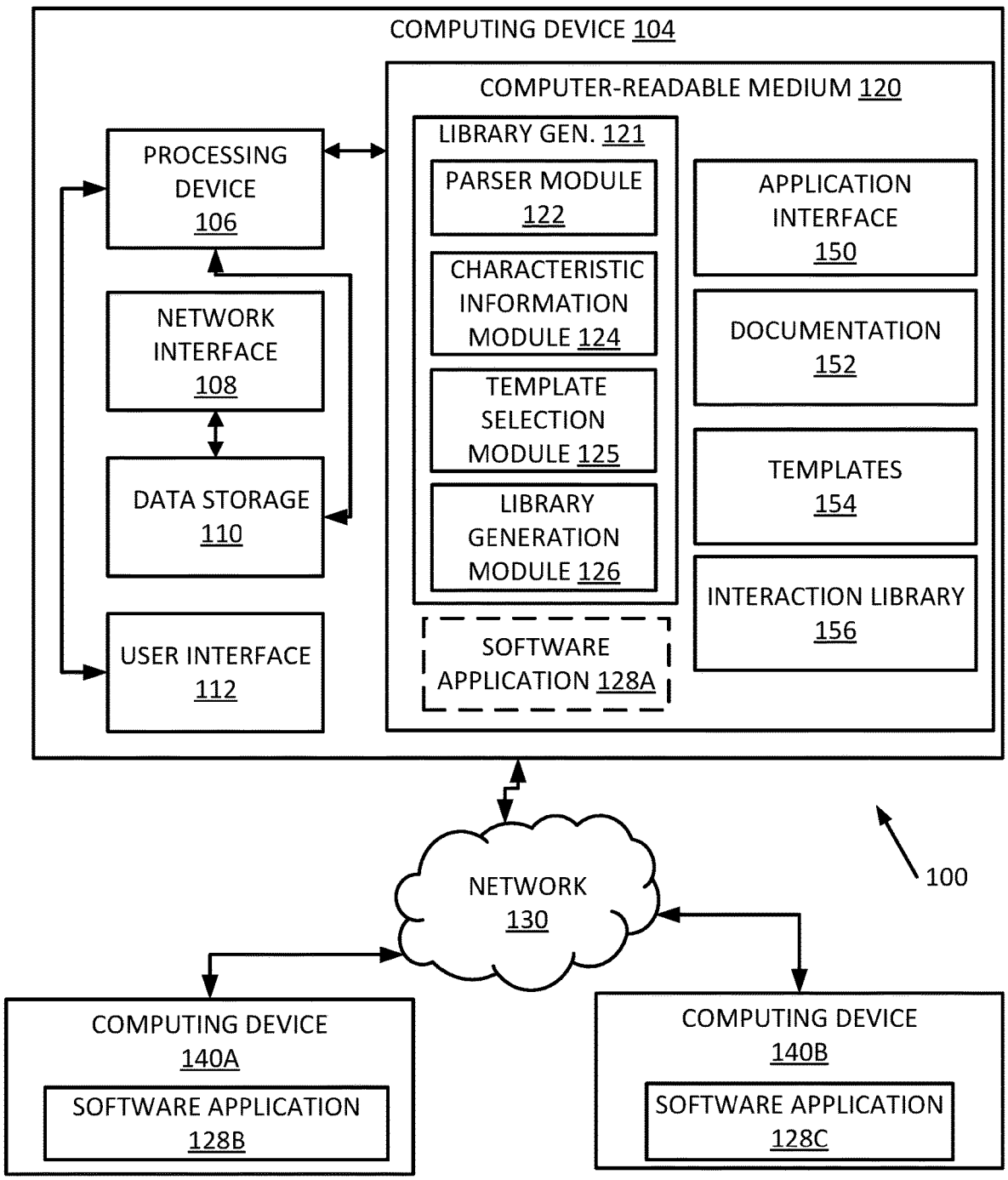
FIG. 1 is a block diagram of an example of a system for generating interaction libraries according to some aspects.

Interaction libraries enable software developers to easily integrate interaction with an application interface such as an application programming interface (API) or command line interface (CLI) into a computer program they are developing. But creation of these interaction libraries is typically a resource-intensive manual effort by numerous members of a software development team. These manual efforts require interaction library creators and maintainers to know all the details about target application interfaces. Additionally, each time a change is made to an application interface, the maintainer of the interaction library is required to find out about the change, and code it into the interaction library manually. Furthermore, as features and options change from one application interface version to another, maintainers must either maintain multiple versions of their interaction library, or break compatibility with other versions.

Certain aspects and features of the present disclosure overcome one or more of the abovementioned problems by automatically generating interaction libraries based on characteristics derived (e.g., parsed) from documentation for the application interface. In the various examples, application interfaces may be interfaces that enable interaction between two or more software applications such an API or CLI. Examples may enable the rapid and automatic generation of an interaction library, which can then be incorporated into a software application to enable the software application to interact with the application interface. In some examples, the documentation used to generate the interaction library may be the union or disjunction of two different versions of the application interface documentation, respectively. The documentation may be for a specific version of the application interface or may be a comparative combination of the documentation for multiple versions of an application interface.

More specifically, some examples include automatically parsing documentation files such as help files, to identify application interface characteristics. The identified characteristics may be used to fill in a template of source code, producing an interaction library suitable for incorporation (e.g., compilation) in a computer program produced by a developer. This can enable the computer program to interact with a software application (e.g., on a remote server) supported by the application interface.

In some examples, one or more parsers may deconstruct an application interface's documentation in order to identify the characteristics of the application interface. Examples of the characteristics can include one or more syntaxes or commands that are compatible with the application interface. Information that does not relate to the application interface characteristics may be deleted or stripped away. In some examples, application interface characteristics identified within the documentation may be added to an intermediary document (e.g., a YAML file) in preparation for generating an interaction library.

The parsers may be customized according to a file structure or type of documentation associated with an application interface. The custom parser may be provided to a computing device running a library generation engine. In some examples, one or more source code templates ("templates") may be customized or generated to cover specific methods and classes of an application interface. Like the parser, the customized templates may be passed to the computing device hosting the library generation engine. The library generation engine can then generate the interaction library using the custom parser and/or templates. In this way, automated generation of interaction libraries can be customized for a specific application interface's functionality.

As discussed above, discrepancies in interaction set functionality across different versions of an application interface may be problematic to developers. It may be difficult to develop uniform solutions to patching security holes, broken software applications, or add new features if many different versions of an application interface are in use by clients. But some examples of the present disclosure enable quick and automated creation of interaction libraries, which in turn speeds up the overall software development process for computer programs that rely on such interaction libraries.

Some examples also enable more uniform and consistent interaction libraries to be generated, thereby reducing compatibility issues.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

FIG. 1 is a block diagram of an example of a system 100 for generating interaction libraries according to some aspects. The system 100 includes library generation engine 121 having a number of component modules 122-126 enabling the characteristics of an application interface 150 to be determined by extracting (e.g., parsing) them from documentation (e.g., help files) related to the application interface 150.

The application interface 150 may provide access to one or more target software applications 128A-C stored on one or more networked computing devices, such as computing devices 104, 140A and 140B. The library generation engine 121 and its various modules 122-126 may be implemented in software and stored on a non-transitory computer readable medium 120.

A software module may be a self-contained, installable module with computer-executable program code for enabling the library generation engine 121 to interact with other device components and modules. The software modules 122-126 may be produced by various sources, such as different companies or organizations. For example, an organization operating computing device 140B may generate a parser module 122 for documentation of a particular format and/or a library of templates 154, which may be used by library generation engine 121 to generate interaction libraries written in the programming language for which the templates 154 were designed. By enabling various sources to create their own software modules 122-126, improved diversity in programming languages for which software interaction libraries may be generated can be achieved.

In some examples, the software modules 122-126 can be open source and programmed using the same programming language. This may enable a community of developers to quickly and easily create, update, and debug the software modules 122-126, thereby improving the number and quality of the software modules 122-126 available. The software modules 122-126 may be stored in a centralized repository (e.g., GitHub™), from which they can be downloaded (e.g., via the Internet) and installed for use by library generation engine 121.

The system 100 of FIG. 1 includes a computing device 104 in communication with one more other computing devices 140A, 140B through a network 130 via a network interface 108. The network 130 may include any type of network. For example, network 130 may include a local area network, (LAN), a wide area network (WAN), the Internet, or a wireless network, etc. In some examples, the computing device 104 may include specialized testing circuitry/logic and a non-transitory computer readable medium 120. The computer readable medium 120 may include software applications and software code, such as the library generation engine 121, modules 122-126, and target software application 128A. In some examples, the computing device 104 may be a dedicated device or computer having a combination of computer hardware and software (fixed in capability or programmable) specifically designed for executing a specialized function. Specialized discrete non-generic analog, digital, and logic based circuitry may include specially designed components (e.g., a specialized integrated circuit, such as for example an Application Specific Integrated Circuit (ASIC) designed for only implementing an automated process for improving software technology associated with interaction generation modules and associated hardware devices resulting in improved operation of the associated hardware devices. Computing device 104 may receive documentation 152 from one or more of the other computing devices 140A, 140B, an online repository, a website, or elsewhere via a network interface 108. The documentation 152 can include API documentation or CLI help text. The documentation 152 may indicate the functions and corresponding operators available for affecting interaction between a software application and another software application, such as a microservice or an underlying operating system. Also, the documentation 152 may include code for application interface functions and procedures supported by a corresponding application interface version. For example, a documentation 152 file may include one or more syntaxes and one or more commands for the application interface 150.

Parser module 122 comprises a parser executable by processing device 106 for decomposing a documentation 152 file to identify various characteristics of application interface 150 functions or procedures. A parser is a software component that breaks data into smaller elements for easy interpretation or analysis. A parser can analyze input in the form of a sequence of tokens (e.g., words) or program instructions to build a data structure, such as a parse tree or an abstract syntax tree. Parser module 122 may use natural language processing, programming language processing, or both to identify the functions, syntaxes, commands, arguments, and operators for the application interface 150. These characteristics may be identified and extracted by the parser module 122 of library generation engine 121. For example, the parser module 122 may parse, scan, review, or otherwise analyze the documentation 152 to identify application interface characteristics.

In some examples, the computing device 104 may obtain a generated parser module 122. More specifically, the parser module 122 may be generated by processing device 106 of computing device 104 or may be received via network interface 108, having been generated by another computing device such as computing device 140B. In some examples, parser module 122 may be written using a user interface 112, such as a keyboard and mouse. Alternatively, library generation engine 121 may accept a parser module 122 generated by another computing device. The parser module 122 may be designed to identify syntax and structural components of documentation 152 for an application interface 150. In some examples, a different parser module 122 may need to be generated for each new type of documentation the library generation engine 121 must process. The parser module 122 may be configured to identify one or more of API characteristics from API documentation and CLI characteristics from CLI documentation.

In some examples, the documentation 152 is the result of a comparison between different versions of the documentation 152 corresponding to different versions of the application interface 150. The API documentation for software application version 1.2 may be compared to the API documentation for software application version 1.4 to identify the disjunction, e.g., those functions and procedures that are only supported by one software application version. A result of the comparison may be a documentation 152 file containing only those functions and procedures that were not supported by both of the software application versions. CLI documentation may be similarly compared to identify functions that are not common to both software application versions. In such examples, the interaction libraries generated after parsing this documentation 152 may represent an interaction library "bridging the gap" between two software application versions. These techniques may be advantageous in guaranteeing cross-compatibility between specific versions of a software application.

A characteristic information module 124 may obtain the characteristics of the application interface 150 from the parser module 122 and save them to one or more structured files, such as a YAML file or other portable markup language format. These files may indicate which characteristics of the application interface are supported by the software application version. In an example, the structured file may include only CLI characteristics such as commands, operators, and syntax. The structured file may be passed to the library generation module 126 for further processing.

Interaction libraries may be generated by library generation module 126 using the characteristics in the structured file and a template 154 provided by template selection module 125. A template includes segments of program code that are configurable based on the characteristics of the application interface 150 and used to build the interaction library 156. Templates 154 may provide fields to be filled in with application interface characteristics from the one or more structured files. Templates 154 may be pre-determined and stored on the computing device, such as in data storage 110. In some examples, custom templates may be created by other sources and provided to the computing device 104. In some examples, computing devices 140A, 140B may provide computing device 104 with custom templates via the network 130. Template selection module 125 may receive the custom template(s) and provide them to the library generation module 126.

There can be various types of templates. Method templates may include source code for a method (e.g., creating/deleting). Other templates may include source code for a class such as an entity itself, name, base path, and base parameters. Class templates may be filled by many method templates. General templates may handle most of the basic implementation and communication details, authorization or authentication, etc. General templates may be filled up by class templates.

The library generation module 126 may use the characteristics of the application interface 150 to fill in fields within one or more templates 154. The processing device 106 may extract the characteristics from the one or more structured files according to instructions of the library generation module 126 and may use the extracted characteristics to populate fields within the source code of a template 154. For example, a command and operator may be extracted from a structured file containing CLI characteristics and inserted into a class template having a field associated with or related to the command. The result may be an interaction library 156. Generated interaction libraries may be incorporated into (e.g., compiled) a software application version to enable the software to leverage the application interface 150. Thus, the library generation engine 121 and its component modules may produce an interaction library 156 enabling differing software application versions to leverage one another's application interface functionality.

In some examples, computing devices 140A, 1408 may be running versions of a software application 128B, 128C that differ from the version of software application 128A. The software application 128B, 128C on each of the computing devices 140A, 1408 may comprise a different version or build configuration. Computing devices 140A, 1408 may be physical or virtual, local or remote, single instance or multi-instance, cumulous or distributed, etc.

The software application 128A, 128B, 128C represents a target software application for which the application interface 150 serves as an intermediary through which various functionality is effectuated. In some examples, the library generation engine 121 may create an interaction library 156 based on a comparison of the documentation 152 of one or more of versions of a software application 128A, 128B, and 128C. The software application or a snapshot, image, or package of the software application may run on the computing device 104 that may vary between test environments or geography. Software application 128A, 128B, 128C may be registered with an automation system and may be associated with one or multiple environments and/or geographical locations. Each software application 128A, 128B, 128C may be registered with a unique name.

The components shown in FIG. 1 are exemplary, and other examples can include more components, fewer components, different components, or a different configuration of the components shown in FIG. 1.

Figure 2:
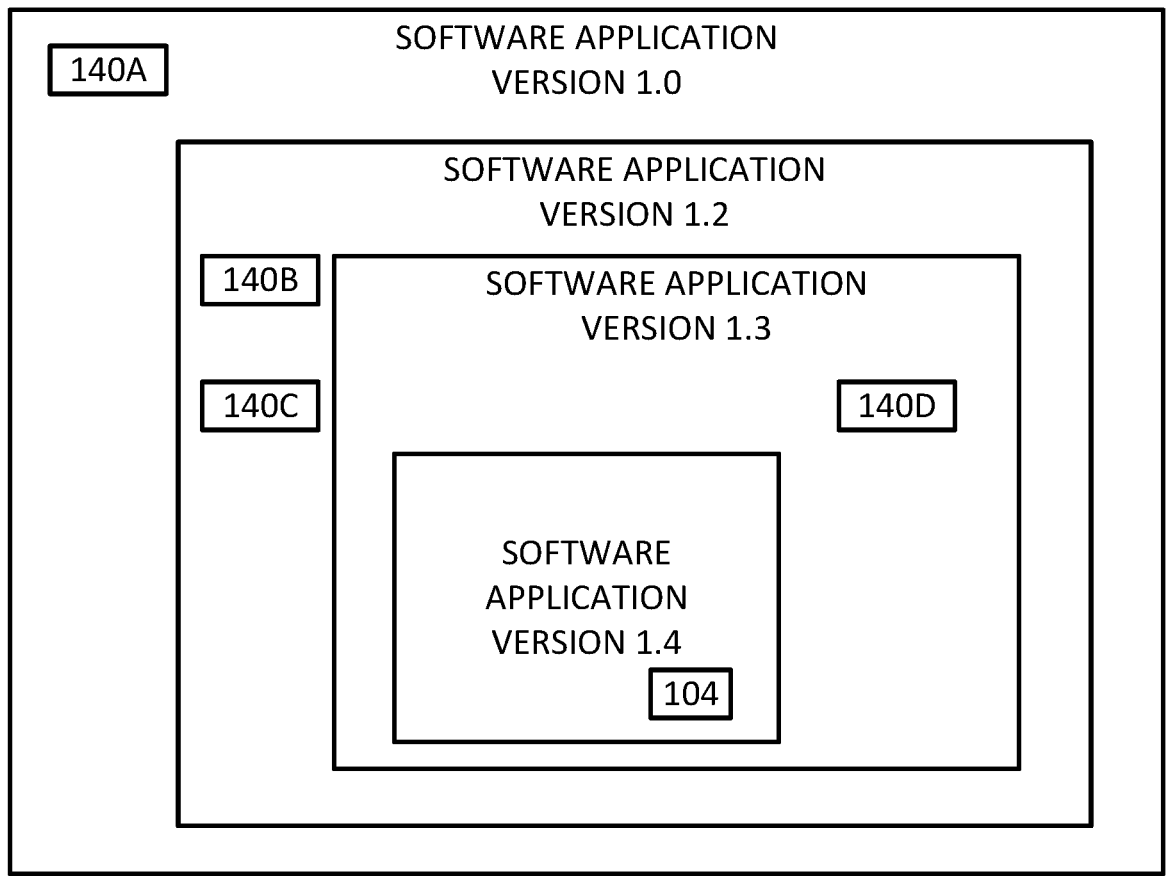
FIG. 2 is a block diagram of different versions of an application interface for software applications according to some aspects.

FIG. 2 is a block diagram of different versions of a software application according to some aspects. A number of computing devices, e.g., computing device 104 and computing devices 140A-140D may each host a software application version. Different computing devices may host different software application versions and thus may utilize differing application interface functions and procedures.

Software application users may elect to forego software updates or may not have access to updates on a regular basis. As a result, discrepancies in software application versions exist across a user base of the software application. This may render some newer features inaccessible to users of older software application versions. Such features may include those related to application-to-application, application interface 150, functions. The installation of interaction libraries may enable use of application interface functions not originally supported by a user's software application version.

The concentric bold-line blocks of FIG. 2 illustrate groups of computing devices (e.g., computing device 104 and computing devices 140A-140D) hosting the same build and version of a software application. In the inner most block, computing device 104 may host version 1.4 of the software application version. This may be a most recent version usable with application interface characteristics set A, which includes the application interface characteristics sets of all previous software application versions and adds additional functionality.

Computing device 140D may host version 1.3 of the software application version. This may be a satellite version usable with application interface characteristics set B. Characteristics set B may include some or all of the interaction features of prior versions, but not necessarily those application interface characteristics that are new to of version 1.4. For example, some but not all of the command line functions or operations available to computing device 104 may be available to computing device 140D.

Similarly, computing devices 140B and 140C may host version 1.2 of the software application version, which is usable with application interface characteristics set C. Some of the functions of application interface characteristics set C may overlap with A and B. Some or all of the functions of previous versions may be incorporated into application interface characteristics set C.

The satellite version 1.0 operating on computing device 140A may be an older version that has not been updated in a while. This version may be usable with application interface characteristics set D, which may have some or a few of the functions available to later versions.

The discrepancy in application interface characteristics set functionality across versions of a software application may be problematic to developers. It may be difficult to develop uniform solutions to patching security holes, broken software applications, or adding new features if many different versions of a software application are in use. The various examples of interaction library generation described herein provide an improvement to software application testing and updating by enabling different versions of a software application to leverage the application interface 150. This added functionality may also enable developers to generate software patches that are cross-compatible across versions and test efficacy quickly and easily.

In an example, the computing devices 140A-140D may transmit a snapshot, compilable file, packaged file, or installer to the computing device 104. The computing device 104 may compile or install the software application version included in the snapshot. The computing device 104 may then generate an interaction library 156 for the version and may incorporate this interaction library 156 into a software application to enable access to the application interface 150 functions and procedures.

Figure 3:
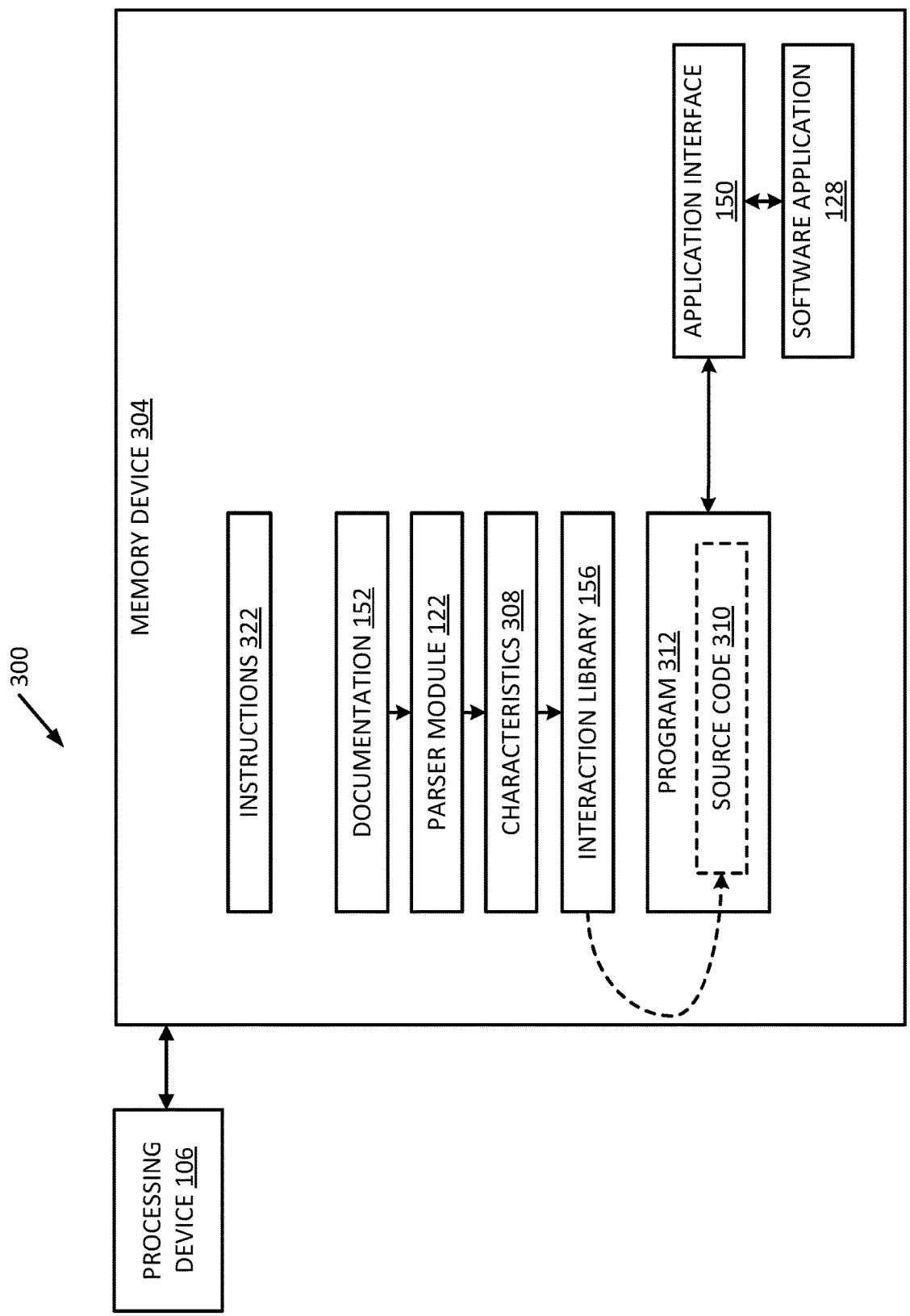
FIG. 3 is a block diagram of another example of a system for generating interaction libraries according to some aspects.

FIG. 3 is a block diagram of another example of a system 300 for generating interaction libraries according to some aspects. The components shown in FIG. 3 are exemplary, and other examples can include more components, fewer components, different components, or a different configuration of the components shown in FIG. 3.

The system 300 includes a processing device 106 communicatively coupled with a memory device 304. In some examples, the processing device 106 and the memory device 304 can be part of a computing device, such as computing devices 104 and 140A-140D. The processing device 106 can include one processing device or multiple processing devices. Non-limiting examples of the processing device 106 include a Field-Programmable Gate Array (FPGA), an application-specific integrated circuit (ASIC), a microprocessor, etc. The processing device 106 can execute instructions 322 stored in the memory device 304 to perform operations. In some examples, the instructions 322 can include processor-specific instructions generated by a compiler or an interpreter from code written in any suitable computer-programming language, such as C, C++, C#, etc.

The memory device 304 can include one memory device or multiple memory devices. The memory device 304 can be non-volatile and may include any type of memory device that retains stored information when powered off. Non-limiting examples of the memory device 304 include electrically erasable and programmable read-only memory (EEPROM), flash memory, or any other type of non-volatile memory. In some examples, at least some of the memory device can include a medium from which the processing device 306 can read instructions 322. A computer-readable medium can include electronic, optical, magnetic, or other storage devices capable of providing the processing device 306 with computer-readable instructions 322 or other program code. Non-limiting examples of a computer-readable medium include magnetic disk(s), memory chip(s), ROM, random-access memory (RAM), an ASIC, a configured processing device, optical storage, or any other medium from which a computer processing device can read the instructions 322.

In some examples, the processing device 106 can determine characteristics 308 of an application interface 150 for a software application 128 by applying the parser module 122 to documentation 152 related to the application interface 150. The processing device 106 can then build an interaction library 156 based on the characteristics 308. The interaction library 156 can be configured to be incorporated into source code 310 for a program 312 to enable the program 312 to interact with the software application 128 via the application interface 150.

Figure 4:
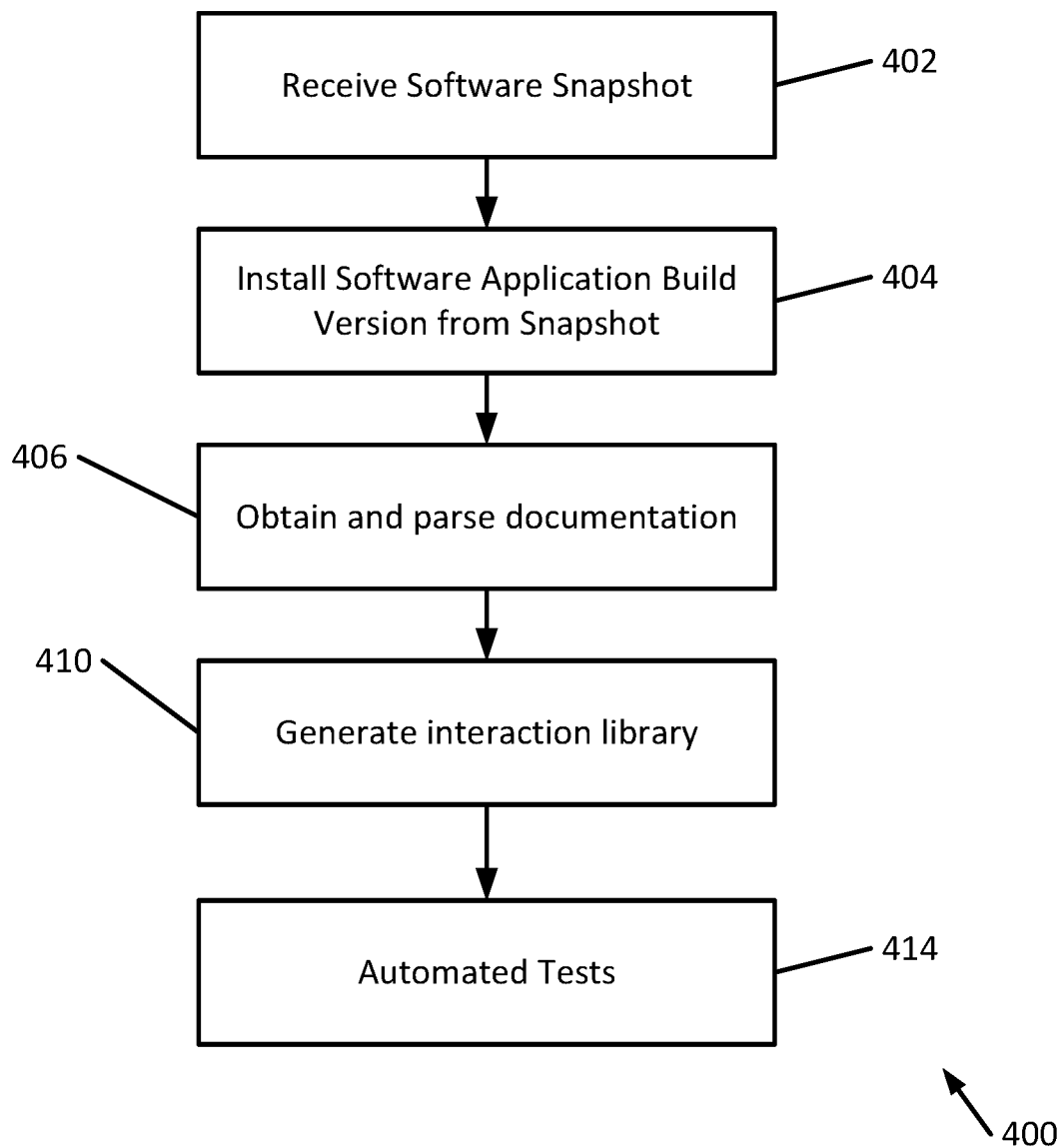
FIG. 4 is a flow diagram of an example of a process for generating an interaction library according to some aspects.

FIG. 4 is a flow diagram of an example process 400 for parsing a software application snapshot or image to obtain application interface characteristics. Other examples can include more steps, fewer steps, different steps, or a different order of the steps than is shown in FIG. 4. The steps of FIG. 4 are discussed below with reference to the components discussed above in relation to FIG. 1.

The process 400 can be implemented by a processing device 106 communicatively coupled to a computer readable medium 120 to execute the library generation engine 121. One or more of the modules 122-126 may enable the library generation module 126 to receive and parse documentation 152 for application interface associated with a software application version.

In block 402, the processing device 106 receives a software application snapshot or image. More specifically, the processing device 106 and/or network interface 108 may receive a snapshot or image of a software application version and library generation engine 121 may accept the software snapshot or image. The software snapshot may be transmitted to the computing device 104 from another computing device (e.g., computing devices 140A, 140B). The software snapshot or image may be stored on or loaded onto the computing device's data storage 110 or computer readable medium 120, such as by mounting a temporary storage media and transferring the file to the computing device 104.

In block 404, the processing device 106 installs the software application version from the received snapshot or image. More specifically, processing device 106 may compile or install the software application version onto data storage 110 and/or computer readable medium 120.

In block 406, the processing device 106 executes library generation engine 121. The library generation engine 121 can obtain documentation 152 for an application interface 150 from a storage of the computing device 104 (e.g., data storage 110), during installation, compilation, or unpacking of the software snapshot or image and may provide this documentation 152 to the parser module 122. The documentation 152 may describe application interface characteristics. This documentation 152 may be parsed by parser module 122 to identify or extract application interface characteristics, which may be temporarily retained in an intermediary file (e.g., a YAML file) by characteristic information module 124.

In some examples, parser module 122 and characteristic information module 124 may enable automatic generation of interaction libraries for APIs and CLIs. For example, these modules can gather characteristic information from documentation 152, such as an API's documentation or from a CLI help text. The parsed information may be used to populate and compile pre-defined template files by characteristic information module 124.

In block 410, the processing device 106 executes the library generation engine 121 to generate an API library, a CLI library, or both. More specifically, the processing device 106 may instruct template selection module 125 and library generation module 126 to use the parsed characteristics to fill in a template 154 of source code and generate an interaction library 156. After exporting all the characteristics from an application interface 150 to a YAML file, the library generation engine 121 can be directed to generate an interaction library 156, for any saved version. These interaction libraries contain some or all of the interaction characteristics available in a specific version, and may be generated at any time for any saved version of the software application. The example process 400 may eliminate the need for human maintenance of interaction libraries, once the initial template 154 files are created. The process 400 may additionally eliminate the bottleneck many software testers face of having to wait for their interaction library 156 to be updated, by a maintainer, before they can begin writing automated tests. Such testing may begin in block 414.

Figure 5:
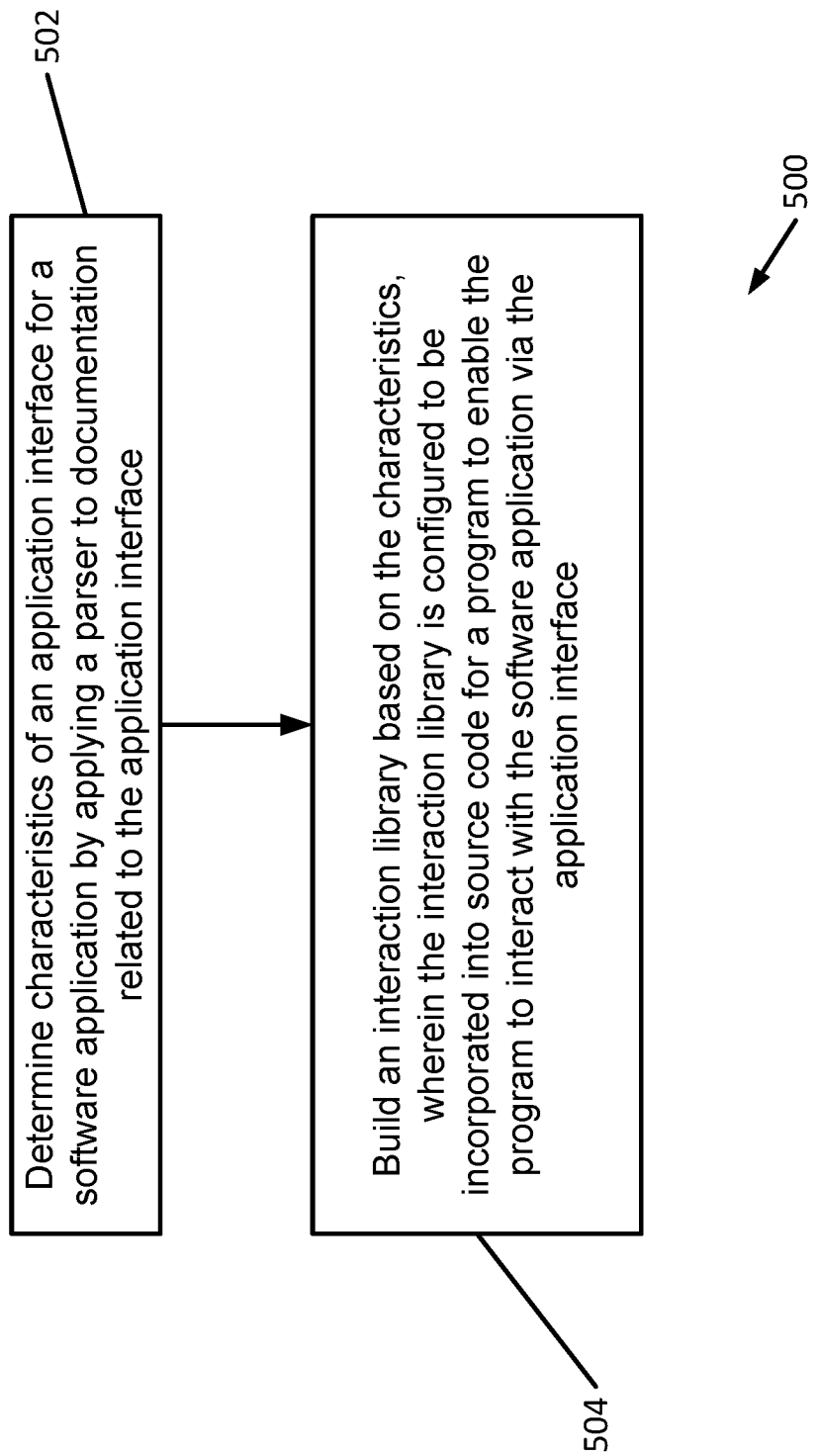
FIG. 5 is a flow diagram of another example of a process for generating an interaction library according to some aspects.

FIG. 5 is a flow chart of an example of a process 500 for generating an interaction library according to some aspects. Other examples can include more steps, fewer steps, different steps, or a different order of the steps than is shown in FIG. 5. The steps of FIG. 5 are discussed below with reference to the components discussed above in relation to FIG. 1.

In block 502 of process 500, the processing device 106 determines characteristics of an application interface for a software application by applying the parser module 122 to the documentation related to the application interface 150. More specifically, processing device 106 may use parser module 122 to analyze, scan, or review the documentation 152 for the application interface 150 to ascertain characteristics of the application interface 150 for the software version. The characteristics may include syntax and command information for the application interface 150, and the parser module 122 may be configured to store the syntax and command information in an intermediary document (e.g., the structured file), the intermediary document being separate from the documentation 152. In an example, the documentation 152 describes a particular version of the application interface 150 and the interaction library 156 is built specifically for that particular version of the application interface 150.

In block 504, the processing device 106 builds an interaction library 156 based on the characteristics, wherein the interaction library 156 is configured to be incorporated into source code for a program to enable the program to interact with the software application via the application interface 150. More specifically, the processing device 106 may use library generation module 126 to apply the determined characteristics to a template 154 containing source code with fields in which the application interface 150 information is to be inserted. Templates may include a method template, a class template, a general template, or any combination. Once the template has been filled with the parsed application interface characteristics, the template may be stored as an interaction library 156.

In some examples, the computing device 104 may receive a selection of a template 154 having segments of program code that are configurable based on the characteristics of the application interface 150 to build the interaction library 156. More specifically, the processing device 106 may receive from template selection module 125 a user input indicating a preferred template for use in generating an interaction library 156. Alternatively, the selected template may have been received along with any of the software application snapshot and a parser module 122. For example a user of another computing device may select a template 154 and transmit the selected template 154 to the computing device 104 prior to generation of the interaction library 156.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure. And the examples disclosed herein can be combined or rearranged to yield additional examples.

The invention claimed is:

1. A system comprising:
a processing device; and
a memory device including instructions for generating interaction libraries, the instructions being executable by the processing device for causing the processing device to:
determine characteristics of an application interface for a software application by applying a parser to documentation related to the application interface;
receive a selection of a template having segments of program code that are configurable based on the characteristics of the application interface, wherein the template comprises a class template that includes a plurality of method templates; and
build an interaction library at least partially by using the template as configured using the characteristics, wherein the interaction library is configured to be incorporated into source code for a program to enable the program to interact with the software application via the application interface.

2. The system of claim 1, wherein the characteristics include a syntax and commands compatible with the application interface, and wherein the parser is configured to store information about the syntax and commands in an intermediary document, the intermediary document being separate from the documentation and configured to be ingested by a library generation engine to generate the interaction library.

3. The system of claim 1, wherein the application interface is an application programming interface, and wherein the documentation includes one or more help files for the application interface.

4. The system of claim 1, wherein the documentation includes differences between at least two different versions of the application interface and is generated by comparing the documentation for the at least two different versions of the application interface.

5. The system of claim 1, wherein the interaction library includes segments of source code for enabling a plurality of interactions with the application interface, the interaction library being configured to be compiled with the source code for the program into an executable file.

6. The system of claim 1, wherein the memory device further includes instructions for a characteristic information module that is executable by the processing device for causing the processing device to store the characteristics in a structured file, wherein the characteristic information module is an open source module maintained by a community of developers.

7. The system of claim 1, wherein the memory device further includes instructions that are executable by the processing device for causing the processing device to receive the parser from among a plurality of parsers stored in a repository, each parser in the plurality of parsers being configured to parse a particular type of documentation that is different from other types of documentation associated with other parsers in the plurality of parsers.

8. A method comprising:
- determining, by a processing device, characteristics of an application interface for a software application by applying a parser to documentation related to the application interface;
- receiving, by the processing device, a selection of a template having segments of program code that are configurable based on the characteristics of the application interface, wherein the template comprises a class template that includes a plurality of method templates; and
- building, by the processing device, an interaction library at least partially by using the template as configured using the characteristics, wherein the interaction library is configured to be incorporated into source code for a program to enable the program to interact with the software application via the application interface.

9. The method of claim 8, wherein the characteristics include a syntax and commands compatible with the application interface, and wherein the parser is configured to store information about the syntax and commands in an intermediary document, the intermediary document being separate from the documentation and configured to be ingested by a library generation engine to generate the interaction library.

10. The method of claim 8, wherein the application interface is an application programming interface, and wherein the documentation includes one or more help files for the application interface.

11. The method of claim 8, wherein the documentation includes differences between at least two different versions of the application interface and is generated by comparing the documentation for the at least two different versions of the application interface.

12. The method of claim 8, further comprising receiving the parser from among a plurality of parsers stored in a repository, each parser in the plurality of parsers being configured to parse a particular type of documentation that is different from other types of documentation associated with other parsers in the plurality of parsers.

13. The method of claim 8, wherein the interaction library includes segments of source code for enabling a plurality of interactions with the application interface, the interaction library being configured to be compiled with the source code for the program into an executable file.

14. A non-transitory computer readable medium including instructions for generating interaction libraries, the instructions being executable by a processing device for causing the processing device to:
- determine characteristics of an application interface for a software application by applying a parser to documentation related to the application interface;
- receive a selection of a template having segments of program code that are configurable based on the characteristics of the application interface, wherein the template comprises a class template that includes a plurality of method templates; and
- build an interaction library at least partially by using the template as configured using the characteristics, wherein the interaction library is configured to be incorporated into source code for a program to enable the program to interact with the software application via the application interface.

15. The non-transitory computer readable medium of claim 14, wherein the documentation describes a particular version of the application interface and the interaction library is built specifically for that particular version of the application interface.

16. The non-transitory computer readable medium of claim 14, wherein the characteristics include a syntax and commands compatible with the application interface, and wherein the parser is configured to store information about the syntax and commands in an intermediary document, the intermediary document being separate from the documentation and configured to be ingested by a library generation engine to generate the interaction library.

17. The non-transitory computer readable medium of claim 14, wherein the application interface is an application programming interface or a command line interface, and wherein the documentation includes one or more help files for the application interface.

18. The non-transitory computer readable medium of claim 14, wherein the documentation includes differences between at least two different versions of the application interface and is generated by comparing the documentation for the at least two different versions of the application interface.

19. The non-transitory computer readable medium of claim 14, further comprising program code that is executable by the processing device for causing the processing device to receive the parser from among a plurality of parsers stored in a repository, each parser in the plurality of parsers being configured to parse a particular type of documentation that is different from other types of documentation associated with other parsers in the plurality of parsers.

20. The non-transitory computer readable medium of claim 14, wherein the interaction library includes segments of source code for enabling a plurality of interactions with the application interface, the interaction library being configured to be compiled with the source code for the program into an executable file.

* * * * *